United States Patent
Wise

(10) Patent No.: US 7,789,112 B1
(45) Date of Patent: Sep. 7, 2010

(54) METHOD AND SYSTEM FOR INFLATING AN INFLATABLE OBJECT

(76) Inventor: Robert W. Wise, 365 Ely Rd., Petaluma, CA (US) 94954

(*) Notice: Subject to any disclaimer, the term of this patent is extended or adjusted under 35 U.S.C. 154(b) by 921 days.

(21) Appl. No.: 11/595,688

(22) Filed: Nov. 9, 2006

(51) Int. Cl.
*B67C 3/02* (2006.01)

(52) U.S. Cl. ............... 141/95; 141/1; 141/38; 141/83; 141/198

(58) Field of Classification Search ............ 141/38–41, 141/83, 94, 95, 192, 197, 231, 346; 73/146.8, 73/502, 700; 417/234, 313, 411
See application file for complete search history.

(56) References Cited

U.S. PATENT DOCUMENTS

| | | | | |
|---|---|---|---|---|
| 4,456,038 | A * | 6/1984 | Gwaltney et al. | 141/95 |
| 4,614,479 | A * | 9/1986 | Liu | 417/44.6 |
| 4,776,766 | A * | 10/1988 | Brent | 417/44.6 |
| 4,782,878 | A * | 11/1988 | Mittal | 152/417 |
| 5,429,166 | A * | 7/1995 | Anzai et al. | 152/415 |
| 5,611,875 | A * | 3/1997 | Bachhuber | 152/415 |
| 5,891,277 | A * | 4/1999 | Bachhuber | 152/415 |
| 6,148,888 | A * | 11/2000 | Loureiro Benimeli | 152/415 |
| 6,170,542 | B1 * | 1/2001 | Loureiro Benimeli | 141/192 |
| 6,607,384 | B1 * | 8/2003 | Nakanishi | 433/29 |
| 6,705,360 | B1 * | 3/2004 | Bonzer | 141/38 |
| 7,430,900 | B2 * | 10/2008 | Belanger | 73/146 |
| 7,445,533 | B2 * | 11/2008 | Norton et al. | 441/90 |

OTHER PUBLICATIONS

DriveGreen™ Adjustable Preset Pressure Inflator, Website: drivegreen.com, Web page printed out on May 12, 2006.
Automatic Tire Inflator/Deflator PT-702, Website: saleemjacobson.com, Web page printed out on May 12, 2006.
12-Volt Jumpstarter / Tire Inflator by Nocord, Website: homeemergencyusa.com, Web page printed out on May 12, 2006.

* cited by examiner

*Primary Examiner*—Timothy L Maust
(74) *Attorney, Agent, or Firm*—Black Lowe & Graham PLLC

(57) ABSTRACT

A method and system for inflating an object includes providing a portable, programmable inflation system having a logic processor, a memory, a visual display, manual inputs, a compressor with an attached inflation hose, a pressure sensor, and an actuator attached to a valve for releasing pressure from the object. The portable programmable inflation system is moved near the object and the inflation hose is attached. Then, a desired air pressure setting is received from a manual input and stored in memory. Then, the current air pressure in the object is sensed with the pressure sensor, and it is determined whether the air pressure in the object is above or below the desired air pressure setting. Under control of the logic processor, the object is inflated if the air pressure is below the desired air pressure setting or deflated if the air pressure is above the desired air pressure setting.

6 Claims, 14 Drawing Sheets

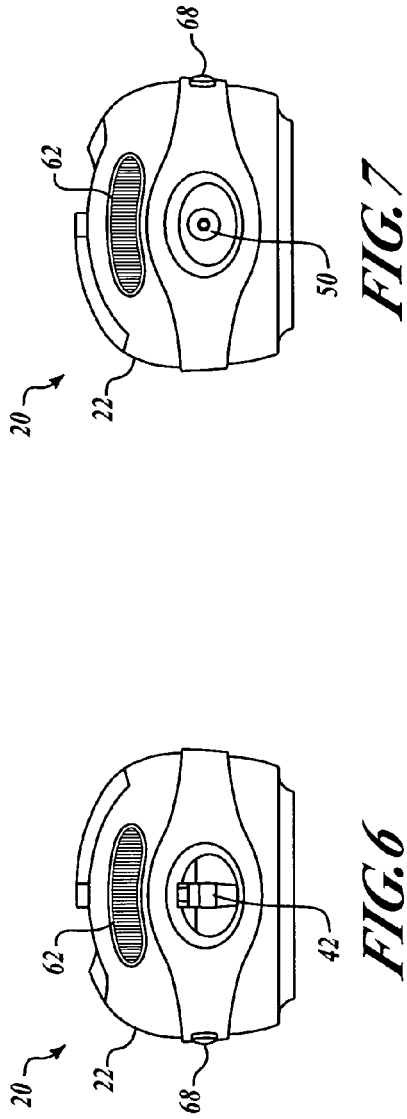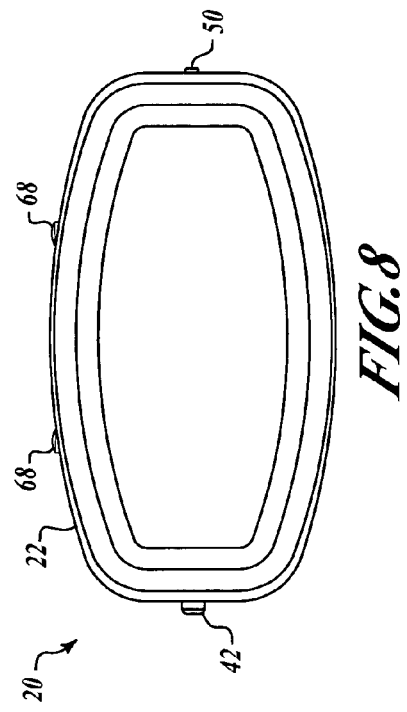

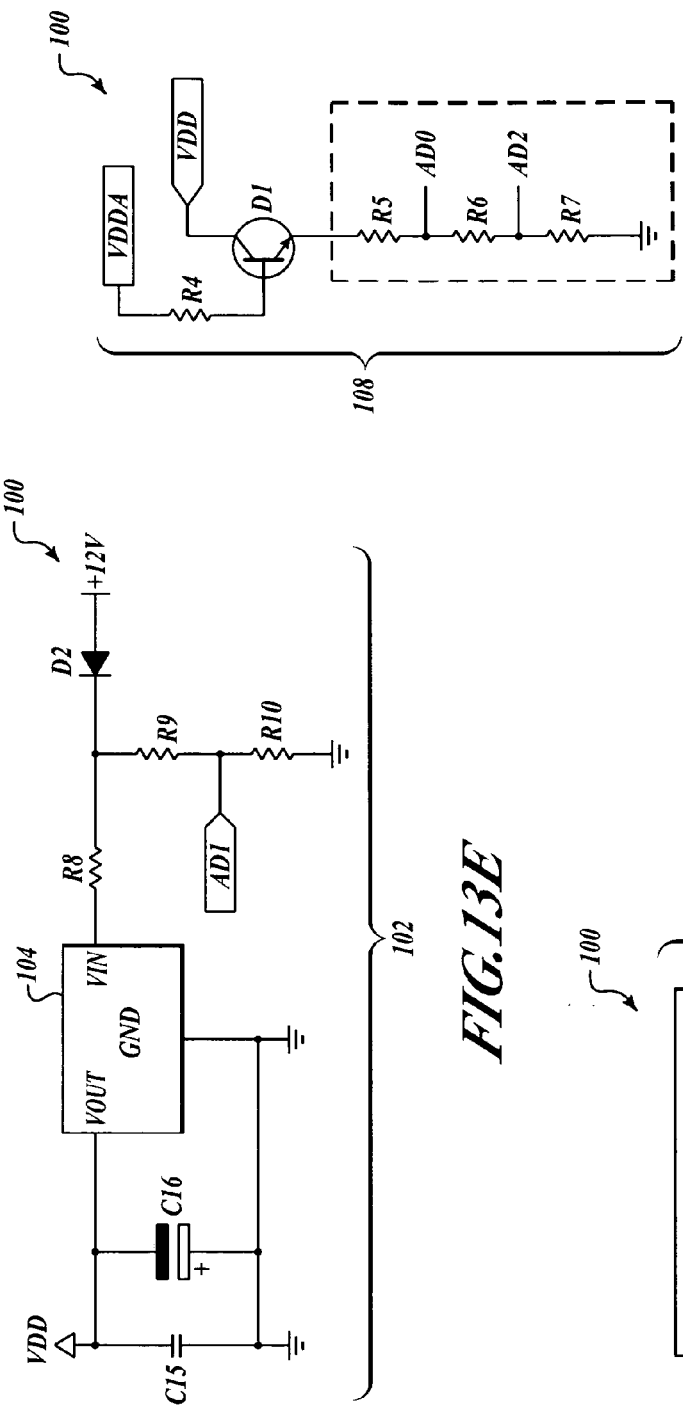

METHOD AND SYSTEM FOR INFLATING AN INFLATABLE OBJECT

FIELD OF THE INVENTION

This invention relates generally to inflation methods and systems. More specifically, the invention relates to inflation methods using portable, programmable inflation devices.

BACKGROUND OF THE INVENTION

Modern, tubeless automobile tires are far more reliable and puncture resistant than their tube based predecessors. Thus, chronic under inflation of automobile tires is less of a problem. Nevertheless, the increased demand for high mileage efficiency and the prevalence of multi-car families has created a consumer demand for portable inflation devices capable of maintaining an automobile's tires at an optimal inflation (i.e. neither over inflated nor under inflated). Various methods and systems of inflating objects (e.g. automobile tires) exist to meet this demand, but they are limited in their portability, programmability, and/or reliance on external air compressors. The DriveGreen™ one-shot tire inflator by Drive Green, Inc. is a portable automatic inflator with a manual preset, but it does not store more than one preset at a time and requires a separate, external air compressor in order to function. In addition, the DriveGreen™ one-shot tire inflator does not have deflation or electronic numeric readout capabilities. The PT-702 programmable tire have deflation or electronic numeric readout capabilities. The PT-702 programmable tire inflator/deflator by Protech is a stationary system and is not portable. In addition, the PT-702 device does not store more than one preset at a time and does not use a 12 Volt power supply. The 12-Volt Jumpstart & Tire Inflator by Nocord uses a 12 Volt power supply, but is not suitable for automatic inflation of multiple sets of tires from multiple cars and does not automatically inflate and deflate to a selected preset air pressure. Accordingly, there is a need for a method of inflating and/or deflating an object to a desired air pressure using a portable, programmable inflation system.

SUMMARY OF THE INVENTION

It is therefore an object of the present invention to provide a method and system for inflating an object or objects (e.g. automobile tires) using a programmable inflation system having multiple pressure presets, an integrated air compressor, and an input for a 12 Volt power supply such as that provided by power sockets in automobiles. In an example embodiment, the method includes providing a portable, programmable inflation system having a logic processor, a memory, a visual display, a plurality of manual inputs, a compressor, an inflation hose connected to the compressor, a pressure sensor in communication with the inflation hose, and an actuator attached to a valve for releasing pressure from the object. The method also preferably includes moving the portable programmable inflation system near the object, attaching the inflation hose to the object, receiving a desired air pressure setting from one of the manual inputs, storing the desired air pressure setting in the memory, sensing current air pressure in the object with the pressure sensor, and determining whether the air pressure in the object is above or below the desired air pressure setting. The method also includes inflating the object under control of the logic processor if the air pressure is below the desired air pressure setting and deflating the object under control of the logic processor if the air pressure is above the desired air pressure setting.

In accordance with further aspects of the invention, alternate embodiments include the use of a portable, programmable inflation system having an illumination device such as a light emitting diode attached to an end of the inflation hose that illuminates the adjacent area.

As will be readily appreciated from the foregoing summary, the invention provides a method of inflating and/or deflating an object to a desired air pressure using a portable, programmable inflation system having multiple pressure presets, an integrated air compressor, and an input for a 12 Volt power supply such as that provided by power sockets in automobiles.

BRIEF DESCRIPTION OF THE DRAWINGS

FIG. 6 is a left side elevational view of the programmable inflation system;

FIG. 7 is a right side elevational view of the programmable inflation system;

FIG. 8 is a bottom plan view of the programmable inflation system;

FIGS. 13A through 13L show a circuit for the programmable inflation system; and

DETAILED DESCRIPTION OF THE PREFERRED EMBODIMENT

Figure 1:
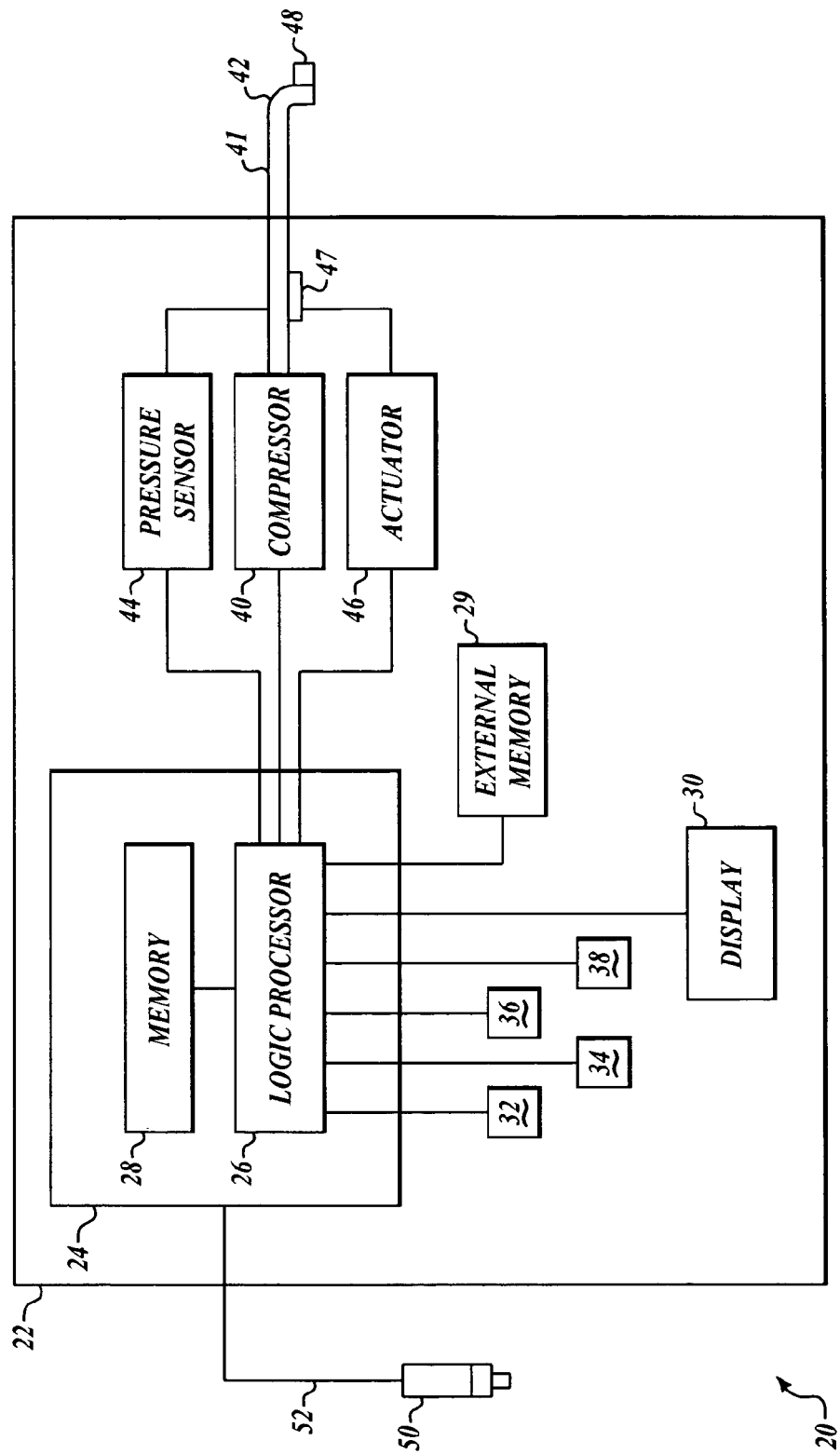
FIG. 1 is a block diagram of a programmable inflation system in accordance with the invention.

A programmable inflation system employing a method in accordance with the principles of the invention is generally indicated at reference numeral 20 in the various FIGURES of the attached drawings in which numbered elements therein correspond to like numbered elements herein. FIG. 1 illustrates in a block diagram form the programmable inflation system 20 formed in accordance with a preferred embodiment of the invention. The programmable inflation system 20 includes a housing 22 (best seen in FIGS. 2 and 9) for containing the system and a programmable controller 24 to provide logic control for the system. The programmable controller 24 includes a logic processor 26 and a memory 28 in data communication with the logic processor 26 as well as various direct outputs to be described further below for controlling various functions of the invention. The memory 28 includes program memory and/or random access memory. In this preferred embodiment, the programmable controller 24 is a microcontroller. The preferred programmable controller 24 is an 8-bit microcontroller, such as the FS98O21 produced by Fortune Semiconductor Corp. However, as understood by those of ordinary skill in this art, the programmable controller 24 may be implemented using discrete components. An external memory 29 is in data communication with the logic processor 26 for the purpose of storing pressure settings entered by a user and/or other information used in the operation of the system 20. The external memory may be an electrically erasable read-only memory (EEPROM) such as the HT24C02 produced by Holtek Semiconductor, Inc., for example.

Figure 2:
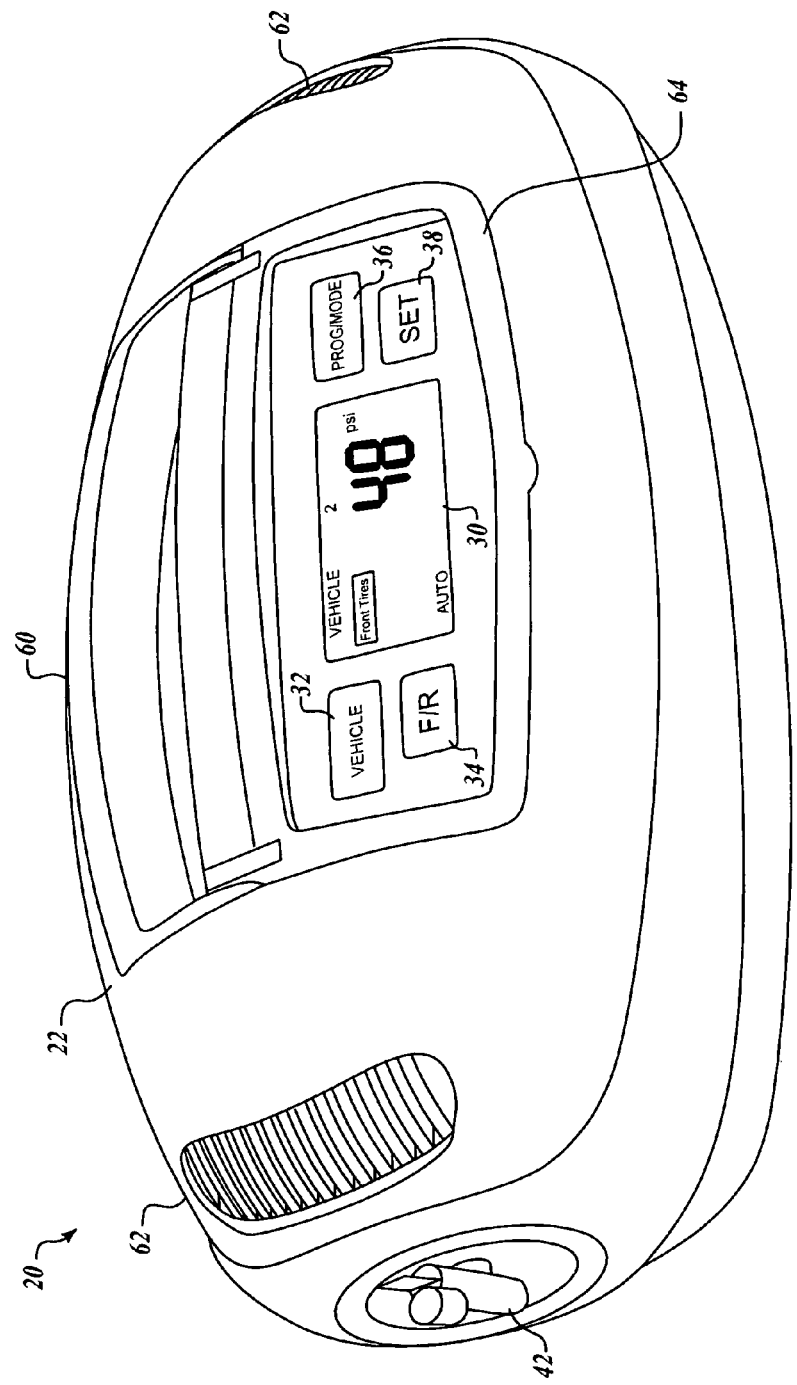
FIG. 2 is an isometric view of the programmable inflation system exterior.
Figure 9:
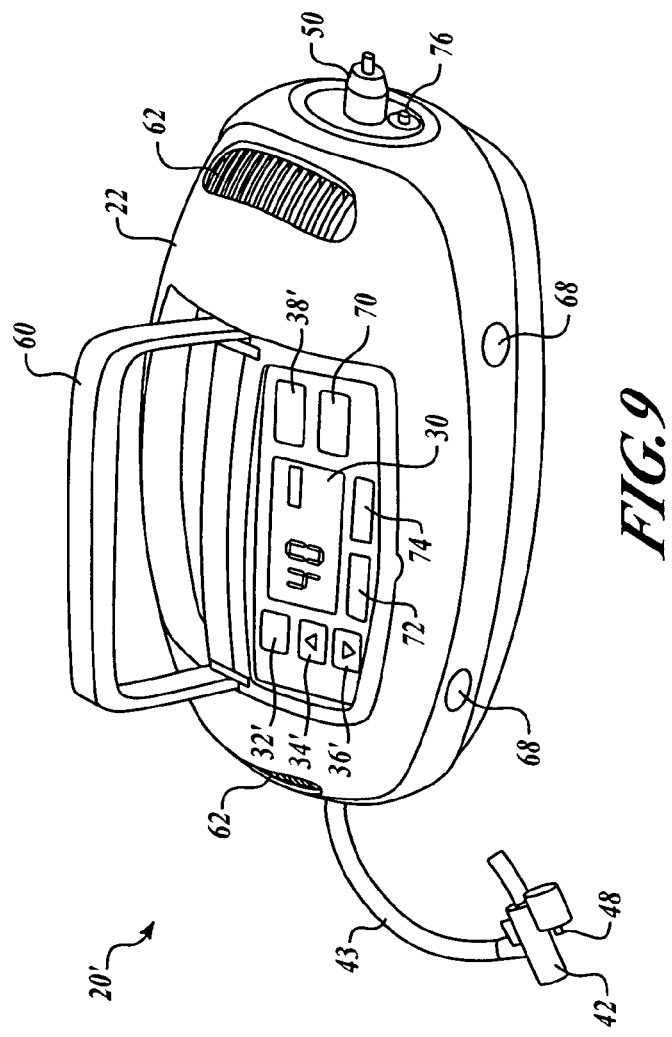
FIG. 9 is an isometric view of an alternative embodiment of the programmable inflation system showing a partially extended inflation hose.

An external display 30, best seen in FIGS. 2 and 9, is in signal communication with the logic processor 26. The display 30 includes a segmented light emitting diode (LED) display in this embodiment. However, in other embodiments, the display 30 includes a different type of display, such as a liquid crystal display (LCD). A first manual input 32, second manual input 34, third manual input 36, and fourth manual input 38 are in signal communication with the logic processor 26. The first, second, third, and fourth manual inputs 32, 34, 36, and 38 are touch sensitive buttons in this embodiment. However the manual inputs 32, 34, 26, and 38 may be push buttons and/or slide controls in other embodiments. The manual inputs 32, 34, 36, and 38 are used for vehicle select (input 32), front/rear select (input 34), program/mode (input 36), and set (input 38). However, in other embodiments the manual inputs 32, 34, 36, and/or 38 may be used for functions such as increase, decrease, select mode, auto, manual, inflate, deflate, set, and/or power on/off.

An air compressor 40 is in signal communication with the logic processor 26. An inflation hose 41 having a nozzle 42 at one end is attached at a distal end to the air compressor 40 such that air is pumped through the inflation hose 41 and out the nozzle 42 when the air compressor 40 is turned on by the logic processor 26. A pressure sensor 44 is also in signal communication with the logic processor 26 and is connected to the inflation hose 41 so as to sense air pressure inside of the inflation hose 41. An actuator 46 is in signal communication with the logic processor 26 and is connected to a valve 47 that is connected to the inflation hose 41 in such a way that the actuator 46 opens and closes the valve 47 as signaled by the logic processor 26. This allows air to be released from the inflation hose 41 when appropriate. In other embodiments, the pressure sensor 44 and/or the valve 47 are connected to a compartment within the compressor 40 having the same air pressure as that within the inflation hose 41 rather than being connected to the inflation hose 41 itself. In still other embodiments, the actuator 46 causes the compressor 40 to actively deflate the object by redirecting the direction of air flow within the inflation hose 41.

An illumination device 48, which is preferably a light emitting diode (LED) in this embodiment, is attached to and located on the nozzle 42 such that it illuminates an area adjacent to the nozzle 42 when the system 20 is turned on. A power plug 50 is electrically connected to a power cord 52 to power the programmable controller 24 and other components of the programmable inflation system 20 such as the compressor 40, actuator 46, display 30, and illumination device 48. The power plug 50 is a 12 volt power plug that is structured to fit within a 12 volt power receptacle such as may be found in many automobiles. However, in other embodiments different types of power plugs and supplies may be used such as standard household 120 volt alternating current. A voltage regulator and/or power converter (both not shown) are used in some embodiments to provide appropriate direct current power levels to the powered components of the programmable inflation system 20.

FIGS. 2 through 8 show various views of the exterior of the first embodiment of the programmable inflation system 20. The programmable inflation system 20 includes a handle 60 attached to the housing 22 for easy manipulation and carrying. In this preferred embodiment, the handle 60 folds into a recess in the top of the housing 22 when not in use and rotates to an upright position when lifted out of the recess for carrying. The housing 22 also includes air vents 62 located on a top surface of the housing 22 at both ends. The air vents 62 allow the compressor 40 to have ready access to ambient air and also provide venting when the valve 47 is releasing air from the inflation hose 41. The inflation hose 41 is shown retracted into the housing 22 so that only the nozzle 42 is visible. The nozzle 42 fits partially within a recess in one end of the housing 22 as shown and may be gripped and pulled to retract the inflation hose 41. This allows for easy storage of the programmable inflation system 20 since there will be no worry over the inflation hose 41 becoming entangled with other items. A cover 64 is pivotably attached to the housing 22 in such a way that the manual inputs 32, 34, 36, and 38 as well as the display 30 are covered when the cover 64 is closed. The cover 64 is formed of a substantially clear polymer material that allows the display 30 to be viewed by a user when the cover 64 is closed.

Figure 3:
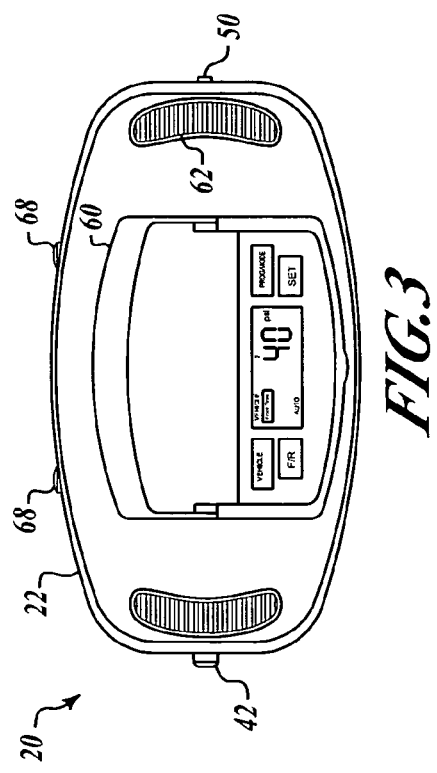
FIG. 3 is a top plan view of the programmable inflation system.
Figure 5:
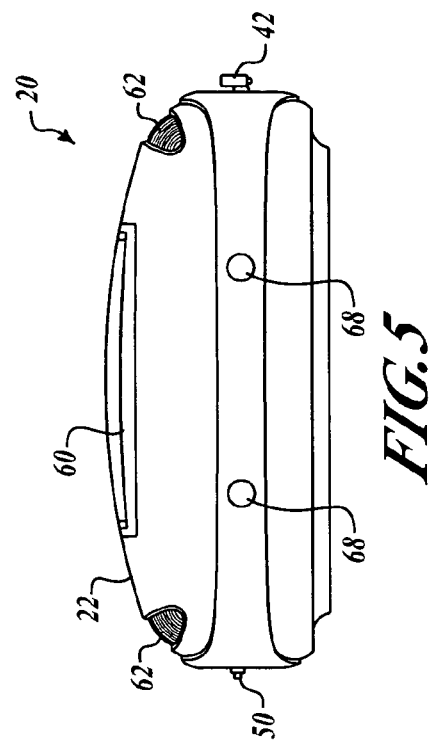
FIG. 5 is a rear elevational view of the programmable inflation system.
Figure 4:
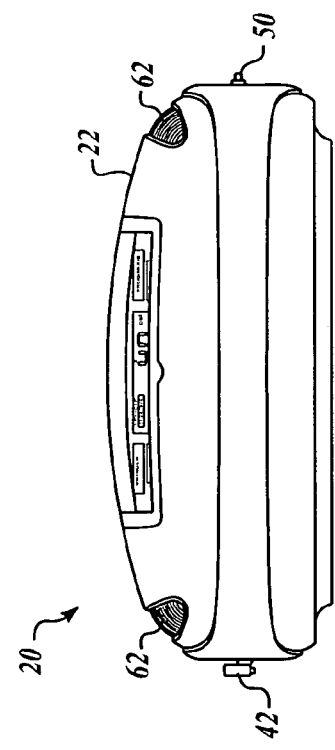
FIG. 4 is a front elevational view of the programmable inflation system.

As best seen in FIGS. 3 through 5, two emergency lights 68 are located on the rear of the housing 22. The emergency lights 68 allow for increased roadside safety when the programmable inflation system 20 is used along a highway and are illuminated when the system 20 is turned on. FIGS. 6 through 8 show the power cord 52 retracted into the housing 22 such that only the plug 50 is visible in the right side view shown in FIG. 7. The plug 50 fits partially within a recess in the right end of the housing 22 as shown and may be gripped and pulled to extend the power cord 52. This allows for easy storage of the programmable inflation system 20 since there will be no worry over the power cord 52 becoming entangled with other items.

Figure 10:
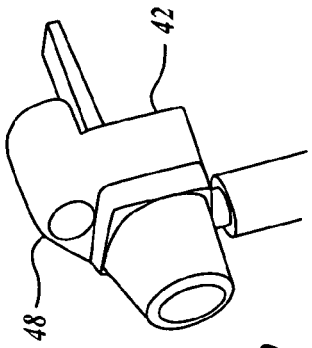
FIG. 10 is an isometric view of the inflation hose end, showing an enlarged view of a nozzle and an illumination device.
Figure 11:
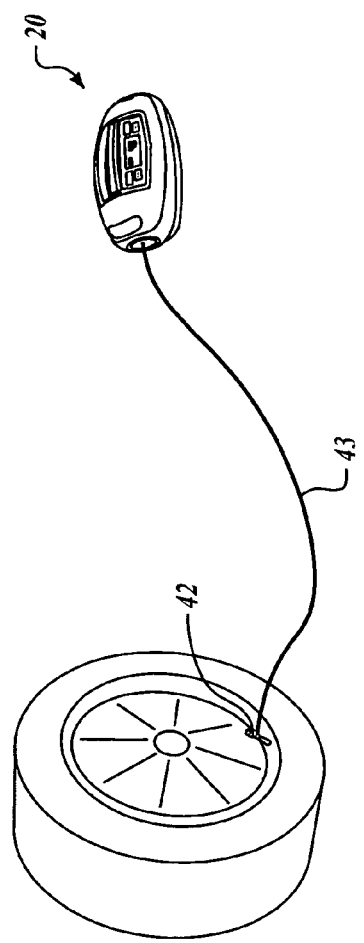
FIG. 11 is an environmental perspective of the programmable inflation system showing the inflation hose extended and attached to an automobile tire.
Figure 12:
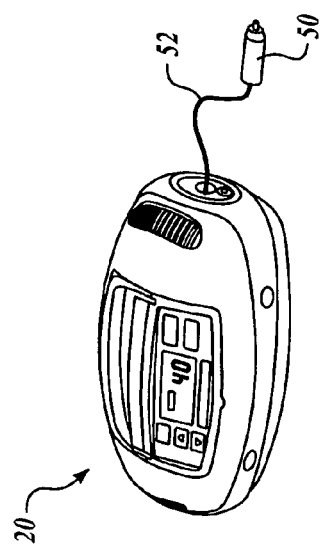
FIG. 12 is a perspective view showing the programmable inflation system with a partially extended power cord.

FIG. 9 is an isometric view of an alternative embodiment of the invention showing a programmable inflation system 20' with the inflation hose 43 partially extended. The handle 60 is shown in its upright position, ready for carrying. In addition to a first, second, third, and fourth manual input 32', 34', 36', and 38' respectively, a fifth manual input 70, sixth manual input 72, and seventh manual input 74 are also located on a top surface of the housing 22. As for the first, second, third, and fourth manual inputs 32', 34', 36', and 38', the fifth, sixth, and seventh manual inputs 70, 72, and 74 are in signal communication with the logic processor 26. The manual inputs 32', 34', 36', 38', 70, 72, and 74 are used for set (input 32'), increase (input 34'), decrease (input 36'), inflate (input 38'), deflate (input 70), auto (input 72), and manual (input 74). However, in other embodiments the manual inputs 32', 34', 36', 38', 70, 72, and/or 74 may be used for functions such as vehicle select, front/rear select, program/mode, and/or pressure units select. An inflation needle 76 is partially shown next to the plug 50 in a storage position within the housing 22. The inflation needle 76 is structured to fit within the nozzle 42 and is used to inflate items such as basketballs, volley balls, soccer balls, and footballs. FIG. 10 illustrates the inflation hose 43 end, showing an enlarged view of the nozzle 42 and illumination device 48. FIG. 11 shows the inflation hose 43 extended with the nozzle 42 attached to a valve stem on an automobile tire. FIG. 12 shows the programmable inflation system 20 with the power cord 52 partially extended.

Figure 13A:
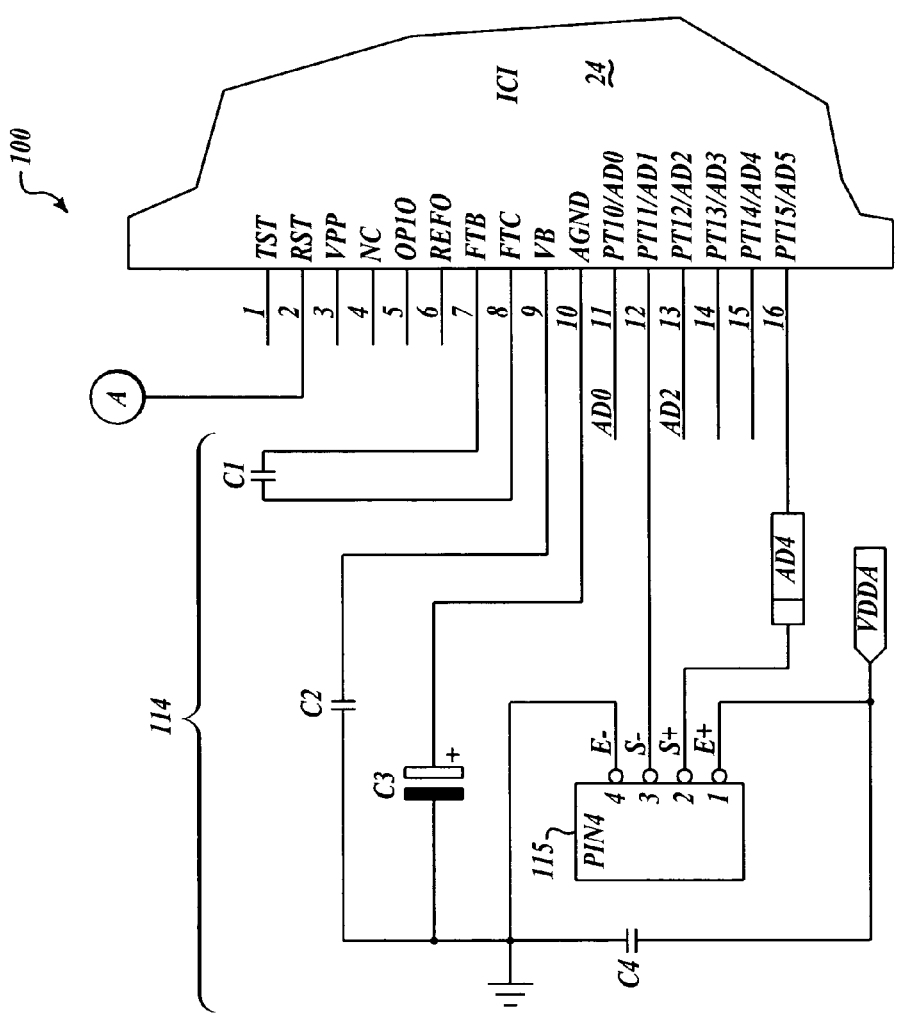
Figure 13B:
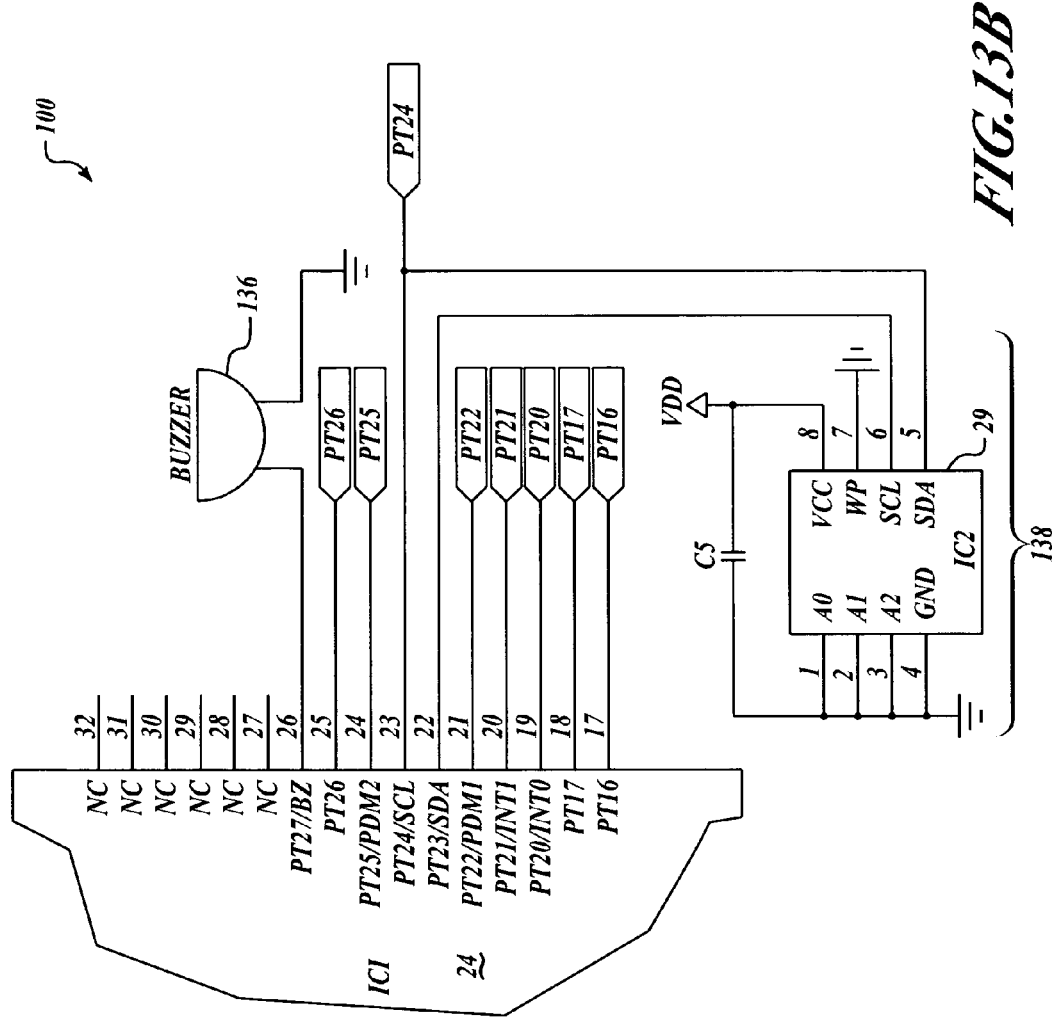
Figures 13C, 13D:
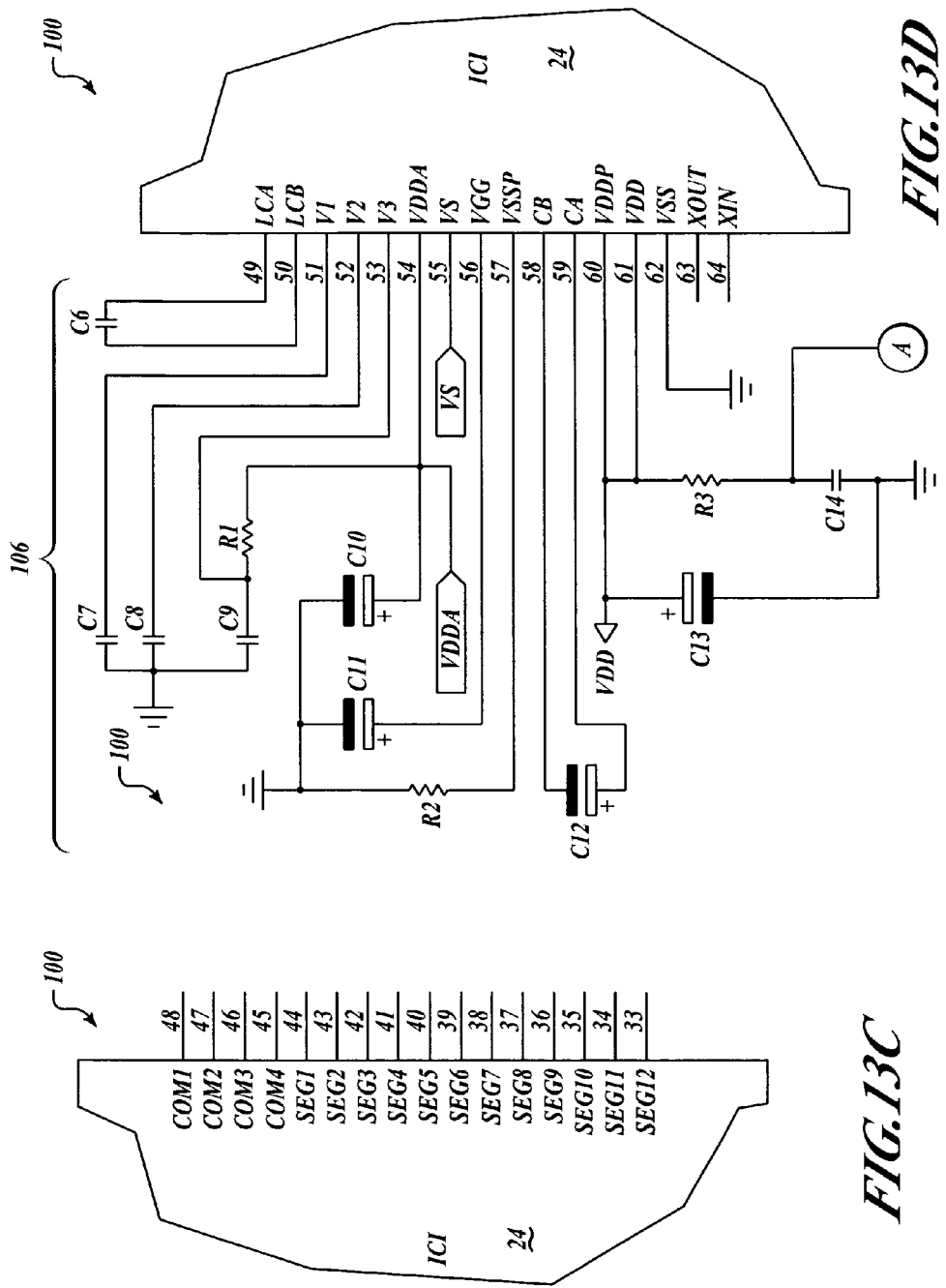
Figure 13I:
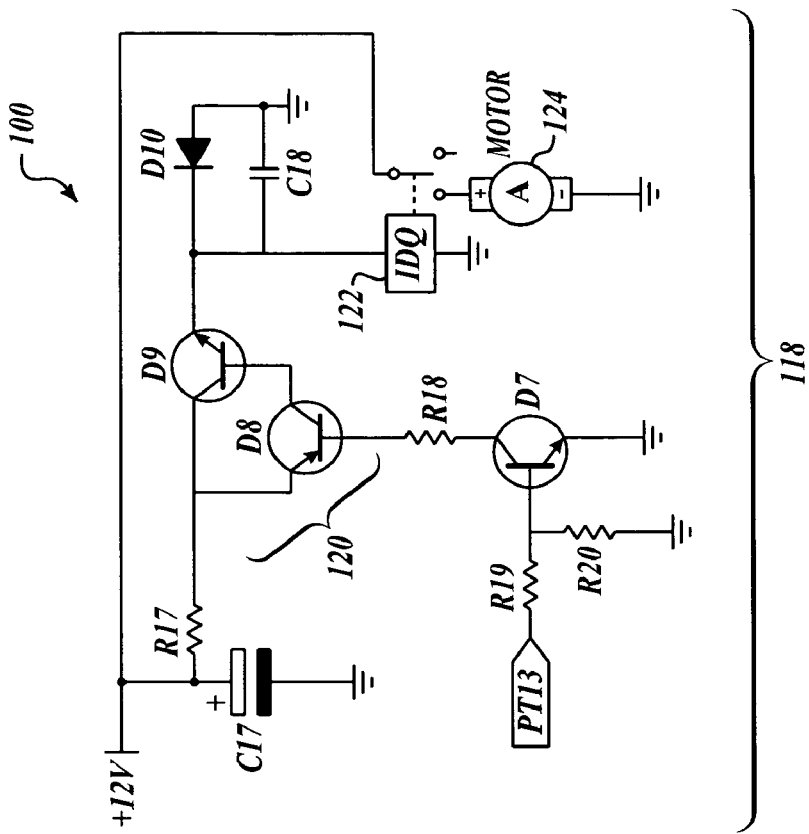

FIGS. 13A through 13L are diagrams of a circuit 100 included in the programmable inflation system 20. The diagrams show detailed interconnections between the programmable controller 24 and other components, such as the external memory 29 and the manual inputs 32, 34, 36, and 38. The programmable controller 24 is a 64-pin microcontroller, such as the FS98O21 produced by Fortune Semiconductor Corp. in this embodiment. However, the programmable controller 24 could be implemented other than by using a single chip microcontroller. With reference to FIG. 13E, the preferred circuit 100 includes a voltage regulating subcircuit 102 that provides a positive power supply VDD to the programmable controller 24 from a 12 Volt power source. The voltage regulating subcircuit 102 includes a voltage regulator 104, such as an HT7133 high voltage regulator produced by Holtec Semiconductor, Inc. With reference to FIG. 13D, a power conditioning subcircuit 106 is structured to properly regulate the power needed for a number of pins of the programmable controller 24.

Figure 13H:
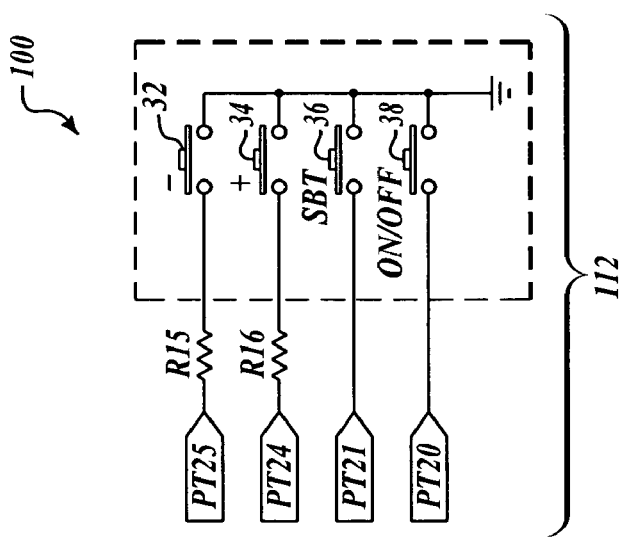

With reference to FIG. 13F, a voltage divider subcircuit 108 provides reference voltages AD0, AD2 to pins 11 and 13 of the microcontroller 24. With reference to FIG. 13H, an input circuit 112 includes the first, second, third, and fourth manual inputs 32, 34, 36, and 38 and contains appropriate circuitry to connect them to the programmable controller 24. In other embodiments, additional manual inputs, such as the fifth, sixth, and seventh manual inputs 70, 72, and 74 (not shown in FIGS. 13A-13L) may be connected in a similar manner.

With reference to FIG. 13A, an analog to digital (A/D) conversion subcircuit 114 includes a pressure sensor connector 115 for connection to the pressure sensor 44 (not shown) and appropriate circuitry to connect the pressure sensor connector 115 to inputs for an analog to digital converter (ADC) included within the programmable controller 24. The A/D conversion subcircuit 114 also includes additional capacitors used by other inputs for the ADC. A power switching subcircuit 118, shown in FIG. 13I, includes a pseudo darlington pair 120 of transistors and a PC board relay 122, such as a Sinlon XLT73-C-S produced by Ningbo Yinzhou Xinglong Electronics Co., Ltd. The power switching subcircuit 118 takes as inputs a 12 Volt power source and a digital output PT13 from the programmable controller 24. The relay 122 switches the 12 V power supply to a motor 124 under control of the digital output PT13. The motor 124 is included in the compressor 40, and causes the compressor 40 to pump air when switched on.

Figure 13J:
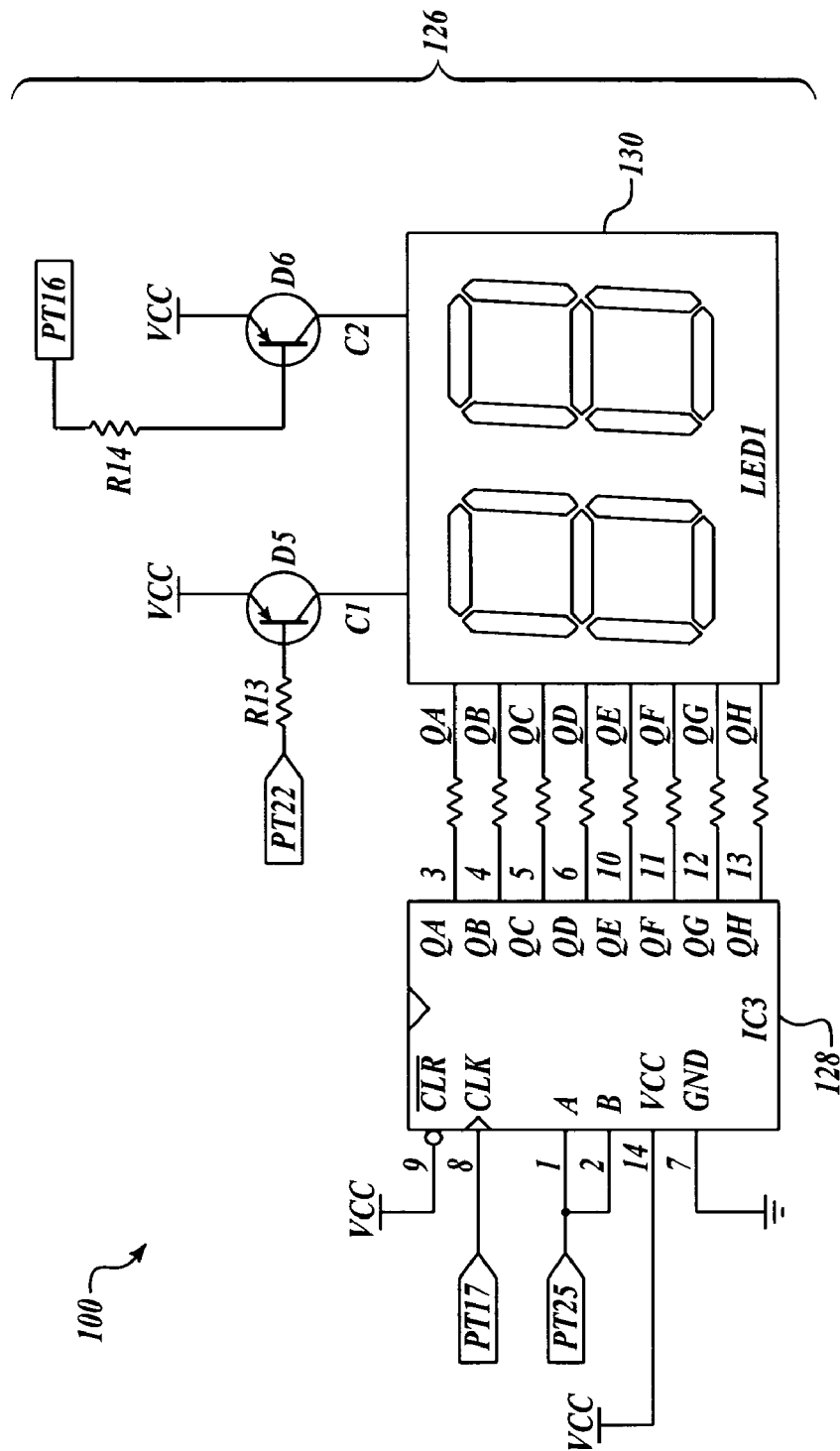
Figures 13K, 13L:
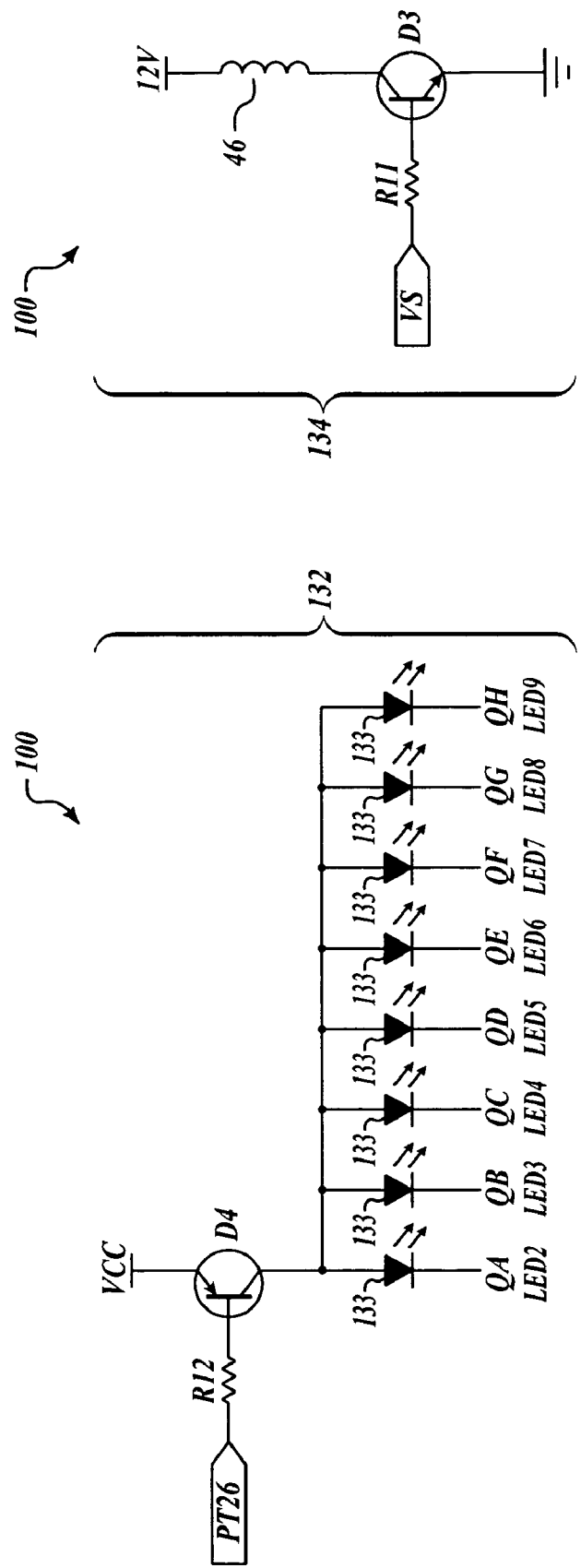

A numeric display subcircuit 126, shown in FIG. 13J, is controlled by four output ports PT16, PT17, PT22, and PT25 of the programmable controller 24. The numeric display subcircuit 126 includes a shift register 128 that is used to drive a two digit LED display 130. The two-digit LED display 130 is used to produce a numeric display of desired and current tire pressure at the appropriate times. The shift register 128 is an 8-bit parallel-out serial shift register in some embodiments, such as an SN74HC164 produced by Texas Instruments, Inc. An indicator LED subcircuit 132, shown in FIG. 13K, is also driven by the shift register 128. The indicator LED subcircuit 132 is used to drive a plurality of indicator LEDs 133, each of which alone or in combination is used to provide a visual indication of various modes and settings currently being used. In an example embodiment, four of the LEDs 133 are used to indicate which of four vehicles are receiving a pressure setting and each of the four remaining LEDs 133 are used for pressure, set, inflate, and deflate indications. In alternative embodiments, the LEDs 133 also indicate whether manual or automatic operation has been selected.

A deflation subcircuit 134, shown in FIG. 13L, is driven by a deflation signal VS controlled by the programmable controller 24. The deflation subcircuit 134 includes the actuator 46, which is a solenoid in this preferred embodiment. A buzzer 136, shown in FIG. 13B, is driven by a buzzer output BZ of the programmable controller 24. The buzzer 136 is sounded by the programmable controller 24 when a desired pressure has been reached. An external memory subcircuit 138 includes the external memory 29, such as an HT24C02 electrically erasable read-only memory (EEPROM) produced by Holtek Semiconductor Inc. The external memory subcircuit 138 is controlled by the programmable controller 24 over pins SCL (μC pin 23) and SDA (μC pin 22). The external memory 29 is used to store desired pressure settings as well as a currently selected pressure setting.

Figure 14:
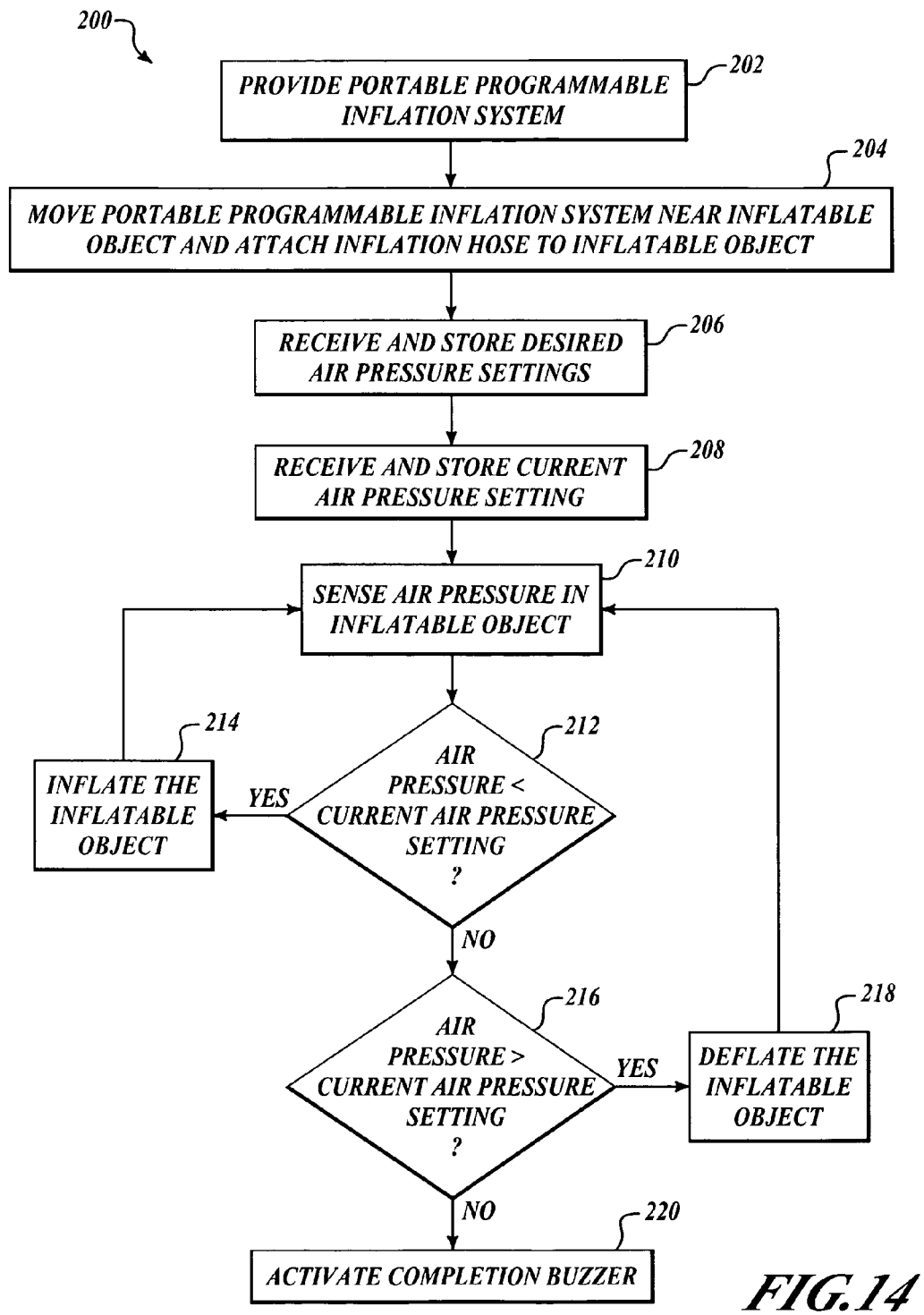
FIG. 14 is a flowchart illustrating a method of inflating an object using the programmable inflation system.

FIG. 14 is a flowchart of a method 200 of inflating an object using the programmable inflation system 20. First, at a block 202, the portable programmable inflation system 20 is provided. Next, at a block 204, the portable programmable inflation system 20 is moved near an inflatable object and the inflation hose 41 is attached to the inflatable object. Then, at a block 206, desired air pressure settings are received via manual inputs 32, 34, 36 and/or 38 and stored in the external memory 29. Following this, at a block 208, a current air pressure setting is received via the manual inputs 32, 34, 36, and/or 38 and stored in the external memory 29. Then, at a block 210, air pressure in the inflatable object is sensed. The air pressure is sensed using the pressure sensor 44 and is displayed on the display 30. Next, at a decision block 212, the portable programmable inflation system 20 determines whether the air pressure in the inflatable object is below the current air pressure setting. If the air pressure is below the current air pressure setting, the inflatable object is inflated at a block 214. Then, the method returns to the block 210 where the air pressure in the inflatable object is sensed. If, at the block 212, the air pressure is determined to not be below the current air pressure setting, the method proceeds to a decision block 216 where the portable programmable inflation system 20 determines whether the air pressure in the inflatable object is above the current air pressure. If the air pressure is above the current air pressure setting, the inflatable object is deflated at a block 218. Then, the method loops back to the block 210. If, at the block 216, the air pressure is determined to not be above the current air pressure setting, the buzzer 136 is activated at a block 220 and the process stops. The sensing at the block 210 also happens concurrently with the inflating or deflating in the blocks 214 or 218 in some embodiments with the determination performed at the blocks 212 and 216 being performed at periodic intervals.

The above described method and apparatus provide a portable, intuitive system for inflating a variety of objects, particularly a plurality of sets of car tires on different vehicles within the same household for use by unsophisticated users. The method and apparatus include multiple presets that hold appropriate inflation pressures for tires or other objects. These presets allow proper inflation information to be set in advance by one person such that it is not even necessary for another person inflating a tire or other object to know the correct level of inflation pressure. The person must simply know the correct preset associated with the tire or other object and that it had been properly set ahead of time.

While the preferred embodiment of the invention has been illustrated and described, as noted above, many changes can be made without departing from the spirit and scope of the invention. For example, in some embodiments pressure settings and the currently selected pressure are stored in memory included within the programmable controller rather than in external memory. Also, in some embodiments, reflectors and/or emergency lights with a reflective portion rather than emergency lights are used. Accordingly, the scope of the invention is not limited by the disclosure of the preferred embodiment.

Instead, the invention should be determined entirely by reference to the claims that follow.

The invention claimed is:

1. A method for inflating an inflatable object to a desired air pressure, comprising:
   providing a portable programmable inflation system having a logic processor, a memory, a visual display, a plurality of manual inputs, a compressor, an inflation hose connected to the compressor, a pressure sensor in communication with the inflation hose, and an actuator attached to a valve for releasing pressure from the object;
   moving the portable programmable inflation system near the inflatable object such that the inflation hose will reach the inflatable object;
   attaching the inflation hose to the inflatable object;
   receiving a first desired air pressure setting from one of the manual inputs;
   storing the first desired air pressure setting in the memory;
   sensing current air pressure in the inflatable object with the pressure sensor;
   receiving a second desired air pressure setting from one of the manual inputs and storing the second desired air pressure setting in the memory in conjunction with the first desired air pressure setting; and
   determining whether the air pressure in the inflatable object is above or below the first desired air pressure setting in the logic processor;
   inflating the inflatable object under control of the logic processor using the compressor if the air pressure in the inflatable object is below the first desired air pressure setting until the air pressure in the inflatable object reaches the first desired air pressure setting; and
   deflating the inflatable object under control of the logic processor using the actuator attached to the valve if the air pressure in the inflatable object is above the first desired air pressure setting until the air pressure in the inflatable object reaches the first desired air pressure setting.

2. The method of claim 1, further including the steps of:
   displaying the first desired air pressure setting using the display as the first desired air pressure setting is being entered; and
   displaying the current air pressure on the display.

3. A method for inflating an inflatable object to a desired air pressure comprising:
   providing a portable programmable inflation system having a power cord, a logic processor, a memory, a visual display, a plurality of manual inputs, a compressor, an inflation hose connected to the compressor, a pressure sensor in communication with the inflation hose, and an actuator attached to a valve for releasing pressure from the inflatable object;
   moving the portable programmable inflation system near the inflatable object such that the inflation hose will reach the inflatable object;
   attaching the inflation hose to the inflatable object;
   receiving a first desired air pressure setting through one of the manual inputs;
   storing the first desired air pressure setting in the memory;
   receiving a second desired air pressure setting through one of the manual inputs;
   storing the second desired air pressure setting in the memory with the first desired air pressure setting;
   receiving a current air pressure setting selected from the first desired air pressure setting and the second desired air pressure setting through one of the manual inputs;
   sensing current air pressure in the inflatable object using the pressure sensor;
   determining whether the air pressure in the inflatable object is above or below the current air pressure setting in the logic processor;
   inflating the inflatable object under control of the logic processor using the compressor if the air pressure in the inflatable object is below the current air pressure setting until the air pressure in the inflatable object reaches the current air pressure setting; and
   deflating the inflatable object under control of the logic processor using the actuator attached to the valve if the air pressure in the inflatable object is above the current air pressure setting until the air pressure in the inflatable object reaches the current air pressure setting.

4. The method of claim 3, further including the steps of:
   receiving a third desired air pressure setting through one of the manual inputs;
   storing the third desired air pressure setting in the memory with the first and second desired air pressure settings;
   receiving a fourth desired air pressure setting through one of the manual inputs; and
   storing the fourth desired air pressure setting in the memory with the first, second, and third desired air pressure settings, wherein
   receiving a current air pressure setting is also selected from the third air pressure setting and the fourth air pressure setting through one of the manual inputs.

5. The method of claim 4, further including the steps of:
   displaying the first desired air pressure setting on the display as the first desired air pressure setting is being entered;
   displaying the desired second air pressure setting on the display as the second desired air pressure setting is being entered;
   displaying the third desired air pressure setting on the display as the third desired air pressure setting is being entered;
   displaying the fourth desired air pressure setting on the display as the fourth desired air pressure setting is being entered;
   indicating under control of the logic processor and on the display which of the first desired air pressure setting, second desired air pressure setting, third desired air pressure setting, and fourth desired air pressure setting corresponds to the current air pressure setting; and
   displaying the sensed air pressure using the display.

6. The method of claim 5, including the step of illuminating an area adjacent to an end of the inflation hose with a light emitting diode (LED) provided thereat.

* * * * *